(12) United States Patent
Wang

(10) Patent No.: US 11,490,021 B2
(45) Date of Patent: Nov. 1, 2022

(54) IMAGE CAPTURING DEVICE AND DISTANCE MEASURING DEVICE

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 299 days.

(21) Appl. No.: 16/799,842

(22) Filed: Feb. 25, 2020

(65) Prior Publication Data

US 2021/0266442 A1 Aug. 26, 2021

(51) Int. Cl.
*H04N 5/235* (2006.01)
*G01B 11/14* (2006.01)

(52) U.S. Cl.
CPC ............ *H04N 5/2351* (2013.01); *G01B 11/14* (2013.01)

(58) Field of Classification Search
CPC .... H04N 5/2351; H04N 5/2256; G01B 11/14; G01B 11/026
See application file for complete search history.

(56) References Cited

U.S. PATENT DOCUMENTS

2016/0123723 A1* 5/2016 Wang ..................... G06V 10/40
348/135

* cited by examiner

*Primary Examiner* — Twyler L Haskins
*Assistant Examiner* — Angel L Garces-Rivera
(74) *Attorney, Agent, or Firm* — Winston Hsu

(57) ABSTRACT

An image capturing device comprising an image sensor. The image sensor comprises: a first sensing region, having a first sensing threshold; and a second sensing region, having a second sensing threshold lower than the first sensing threshold. At least one object image is determined to be invalid when the object image captured by the first sensing region has brightness formation lower the first sensing threshold. At least one the object image is determined to be invalid when the object image captured by the second sensing region has brightness formation lower the second sensing threshold. The present invention also discloses a distance measuring device using the image sensor.

16 Claims, 5 Drawing Sheets

Th_1 > Th_2 > Th_3

Th_1 > Th_2 > Th_3

IMAGE CAPTURING DEVICE AND DISTANCE MEASURING DEVICE

BACKGROUND OF THE INVENTION

1. Field of the Invention

The present invention relates to an image capturing device and a distance measuring device, and particularly relates to an image capturing device and a distance measuring device which can reduce the interference caused by ambient light.

2. Description of the Prior Art

A conventional distance measuring device may use a light source to emit light for computing a distance. However, the ambient light such as light from ceiling or window, or light from other devices, may affect the distance measuring. Accordingly, a new distance measuring mechanism is required to reduce such interference.

SUMMARY OF THE INVENTION

Therefore, one objective of the present invention is to provide an image capturing device which can reduce the interference caused by the ambient light.

Another objective of the present invention is to provide a distance measuring device which can reduce the interference caused by the ambient light.

One embodiment of the present invention provides an image capturing device comprising an image sensor. The image sensor comprises: a first sensing region, having a first sensing threshold; and a second sensing region, having a second sensing threshold lower than the first sensing threshold. At least one object image is determined to be invalid when the object image captured by the first sensing region has brightness formation lower the first sensing threshold. At least one the object image is determined to be invalid when the object image captured by the second sensing region has brightness formation lower the second sensing threshold.

Another embodiment of the present invention discloses a distance measuring device comprising a light source, an image sensor and a control circuit. The image sensor is configured to capture at least one object image generated by light from the light source or generated by ambient light and comprises: a first sensing region, having a first sensing threshold; and a second sensing region, having a second sensing threshold lower than the first sensing threshold. The control circuit is configured to compute a distance between the image sensor and a target article according to the object image. The control circuit does not use the object image to compute the distance when at least one object image captured by the first sensing region has brightness formation lower than the first sensing threshold. The control circuit does not use the object image to compute the distance when at least one object image captured by the second sensing region has brightness formation lower than the second sensing threshold.

In view of above-mentioned embodiments, the distance measuring devices and the image sensor provided by the present invention can reduce the interference caused by the ambient light.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
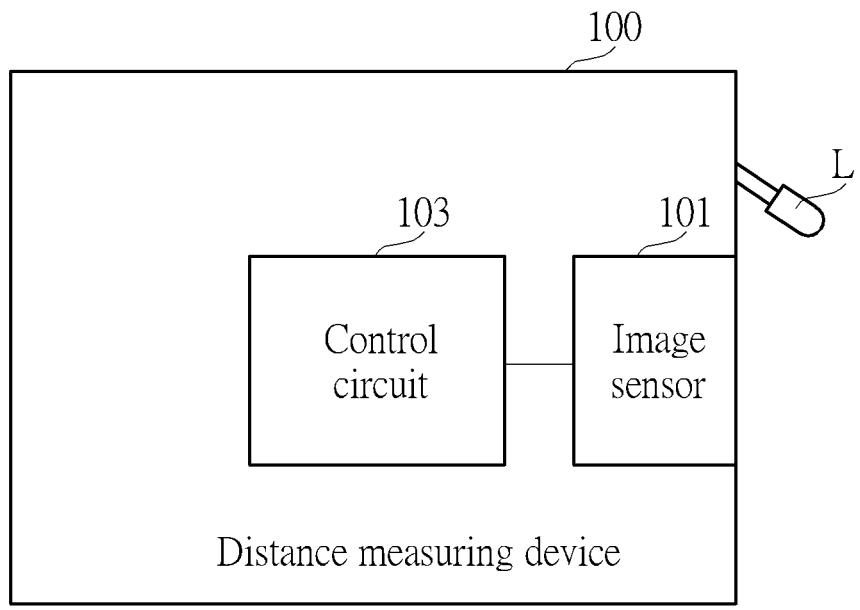
FIG. 1 is a block diagram illustrating a distance measuring device according to one embodiment of the present invention.
Figure 2:
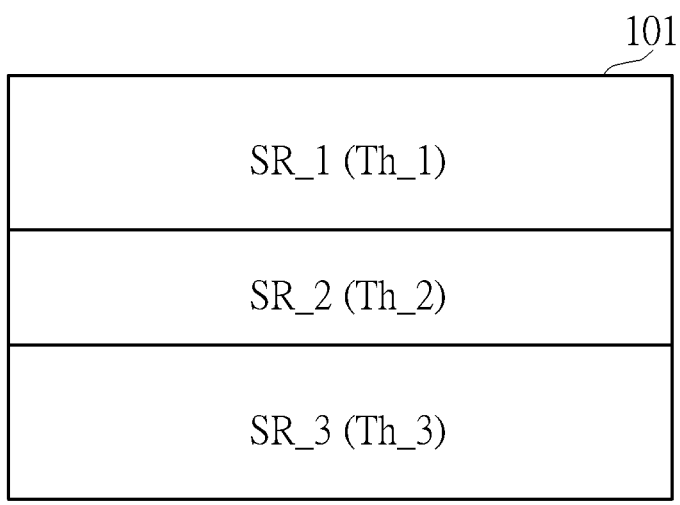
FIG. 2 is a schematic diagram illustrating an image sensor according to one embodiment of the present invention.

FIG. 1 is a block diagram illustrating a distance measuring device according to one embodiment of the present invention. FIG. 2 is a schematic diagram illustrating an image sensor according to one embodiment of the present invention. Please refer FIG. 1 with FIG. 2 to understand the concept of the present application for more clarity. As illustrated in FIG. 1, the distance measuring device 100 comprises a light source L, an image sensor 101 and a control circuit 103. The light source L is located above the image sensor 101 and can be a point light source or a line light source, but not limited. The image sensor 101 is configured to capture at least one object image generated by light from the light source L or generated by ambient light (e.g. light from ceiling or window, or light from other devices). For the convenience of explaining, the object image generated by ambient light is named as flicker image herein after.

As illustrated in FIG. 2, the image sensor 101 comprises a first sensing region SR_1 having a first sensing threshold Th_1 and a second sensing region SR_2 having a second sensing threshold Th_2 lower than the first sensing threshold Th_1. In the embodiment of FIG. 2, the image sensor 101 further comprises a third sensing region SR_3 having a third sensing threshold Th_3 lower than the second sensing threshold Th_2, but not limited. The image sensor 101 can only comprise the first sensing region SR_1 and the second sensing region SR_2. Further, in the embodiment of FIG. 2, the third sensing region SR_3 is below the second sensing region SR_2, and the second sensing region SR_2 is below the second sensing region SR_1. The sizes of the first sensing region SR_1, the second sensing region SR_2 and the third sensing region SR_3 can be set according to design requirements. For example in one embodiment, a size of the second sensing region is smaller than a size of the first sensing region SR_1, but not limited. Such rule can be applied to any other embodiment.

The control circuit 103 is configured to compute a distance between the image sensor 101 and a target article (e.g. a wall or a furniture) according to the object image captured by the image sensor 101. The control circuit 103 does not use the object image to compute the distance when at least one object image captured by the first sensing region SR_1 has brightness formation lower than the first sensing threshold Th_1. Also, the control circuit 103 does not use the object image to compute the distance when at least one object image captured by the second sensing region SR_2 has brightness formation lower than the second sensing threshold Th_2.

Figure 3:
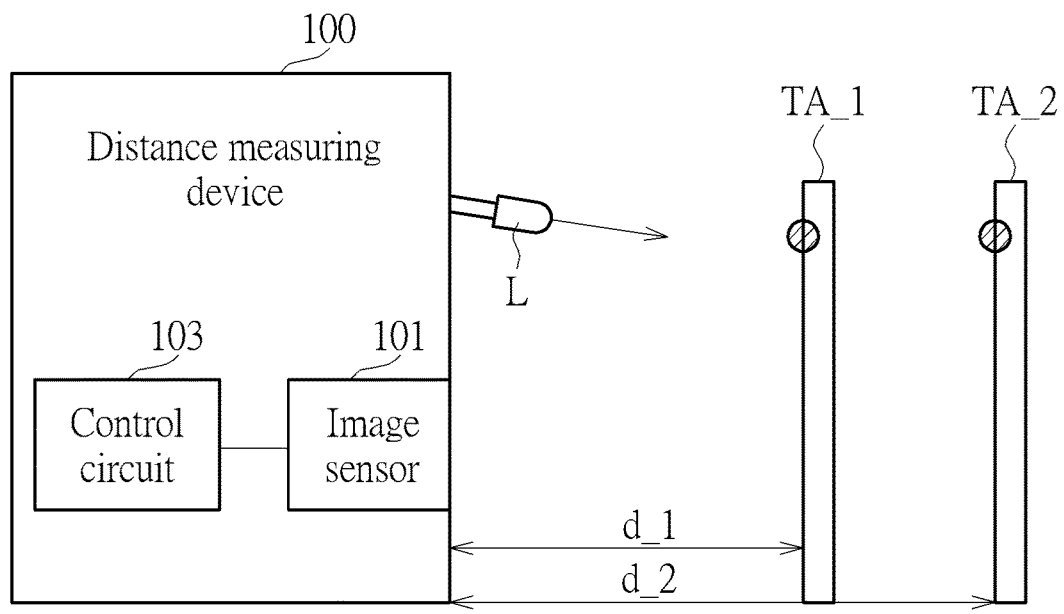
FIG. 3 is a schematic diagram illustrating relations between locations of the distance measuring device and locations of object images and flicker images, according to one embodiment of the present invention.
Figure 3:
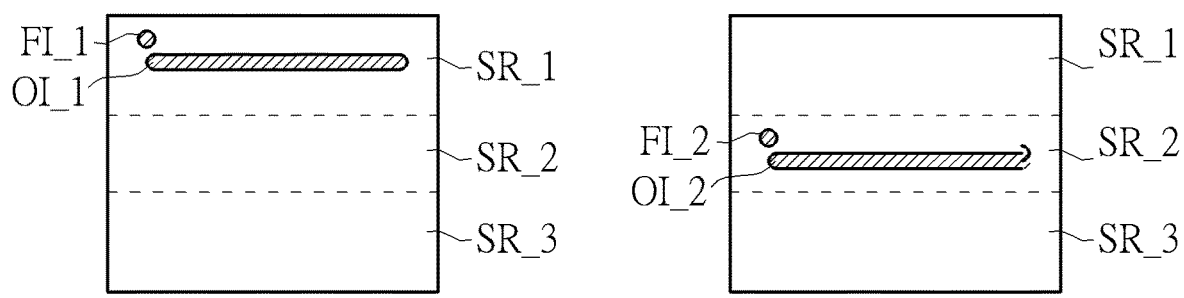

FIG. 3 is a schematic diagram illustrating relations between locations of the distance measuring device 100 and locations of object images and flicker images, according to one embodiment of the present invention. The light source L is a line light source and emits light at an angle inclined downward in the embodiment of FIG. 3. In FIG. 3, the object images OI_1, OI_2 indicate object images generated by light from the light source L, and flicker images FI_1, FI_2 indicate flicker images generated by ambient light. AS illustrated in FIG. 3, the distance measuring device 100 has a first distance d_1 away from the target article TA_1 and a second distance d_2 away from the target article TA_2. The second distance d_2 is larger than the first distance d_1. Light from the light source L respectively generate the object images OI_1, OI_2 on the target articles TA_1, TA_2. Besides, the ambient light generates the flicker images FI_1 and FI_2.

The object image OI_1 and the flicker image FI_1 are captured by the first sensing region SR_1. Also, since the second distance d_2 is larger than the first distance d_1, the object image OI_2 and the flicker image FI_2 move down and are captured by the second sensing region SR_2. Accordingly, the control circuit 103 can determine the distances between the image sensor 101 and the target article TA_1 or TA_2 according to locations of the object images OI_1, OI_2.

Further, the flicker images FI_1 and FI_2 can be filtered by the sensing thresholds TH_1 and Th_2. For more detail, if the brightness information of the flicker image FI_1 captured by the first sensing region SR_1, such as an average brightness value or a minimum brightness value or any data related with brightness value, is smaller than the first sensing threshold Th_1, the control circuit 103 determines the flicker image FI_1 to be invalid. Thus, the control circuit 103 does not use the flicker image FI_1 to compute the distance. Similarly, if the brightness information of the flicker image FI_2 captured by the second sensing region SR_2 is smaller than the second sensing threshold Th_2, the control circuit 103 determines the flicker image FI_2 to be invalid. Thus, the control circuit 103 does not use the flicker image FI_2 to calculate the distance.

Additionally, in the embodiment of FIG. 3, the second distance d_2 is larger than the first distance d_1, thus brightness information of the flicker image FI_2 is lower than the brightness information of the flicker image FI_1. Therefore, the second sensing threshold Th_2 can be set to be lower than the first sensing threshold Th_1. Following the same rule, the third sensing threshold Th_3 can be set to be lower than the second sensing threshold Th_2, as shown in FIG. 1.

Figure 4:
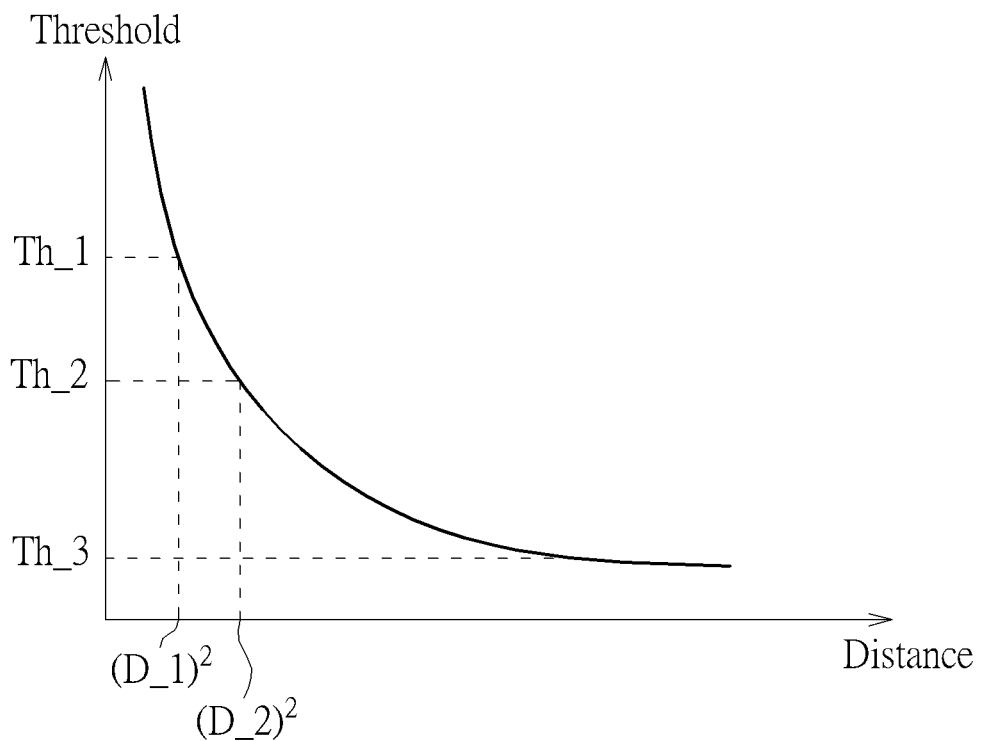
FIG. 4 is a schematic diagram illustrating a distribution for sensing thresholds of the image sensor according to one embodiment of the present invention.
Figure 5:
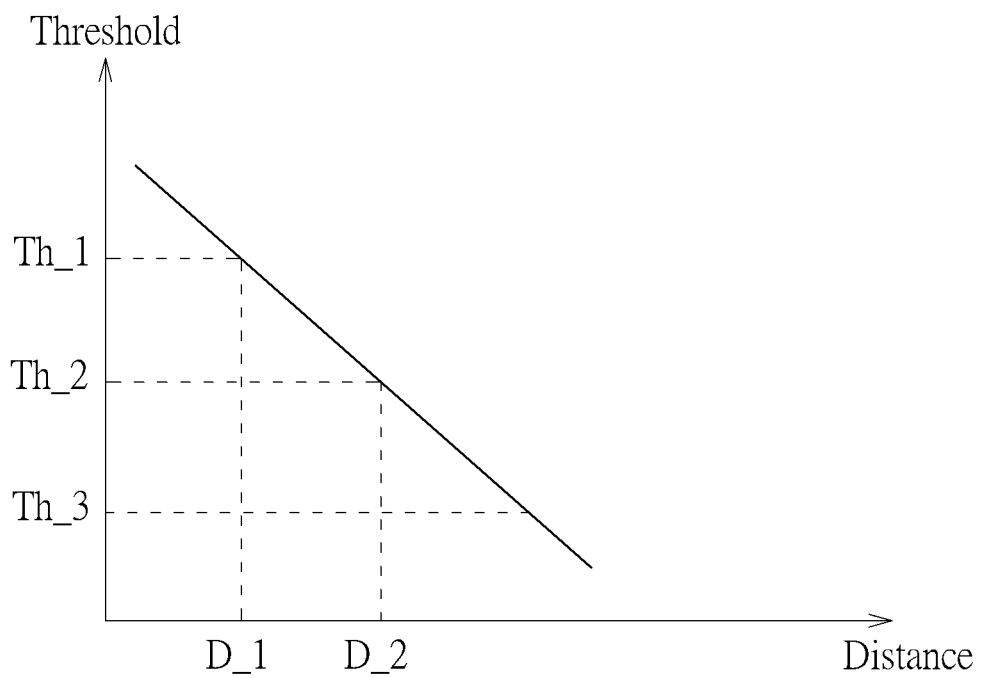
FIG. 5 is a schematic diagram illustrating a distribution for sensing thresholds of the image sensor according to another embodiment of the present invention.

In one embodiment, the sensing thresholds of different sensing regions of the image sensor 101 are proportional to distances between the image sensor 101 and the target article. For example, in the embodiment of FIG. 3, the first sensing threshold Th_1 is inversely proportional to the first distance D_1 and the second sensing threshold Th_2 is inversely proportional to the second distance D_2. FIG. 4 is a schematic diagram illustrating a distribution for sensing thresholds of the image sensor according to one embodiment of the present invention. As illustrated in FIG. 4, the first sensing threshold Th_1 is inversely proportional to a square of the first distance $(D\_1)^2$ and the second sensing threshold Th_2 is inversely proportional to a square of the second distance $(D\_2)^2$. FIG. 5 is a schematic diagram illustrating a distribution for sensing thresholds of the image sensor according to another embodiment of the present invention. As shown in FIG. 5, the first sensing threshold Th_1, the second sensing threshold Th_2, the first distance D_1 and the second distance D_2 have an inversely linear relationship.

However, the relations between the sensing thresholds and the distances are not limited to above-mentioned examples. For example, in one embodiment, a difference between the first sensing threshold Th_1 and the second sensing threshold Th_2 is inversely proportional to a difference between the first distance D_1 and the second distance D_2. Persons skilled in the art can set the sensing thresholds of different sensing regions of the image sensor 101 and distances between the image sensor 101 and the target article to have any relationship. Such variation should also fall in the scope of the present invention.

Figure 6:
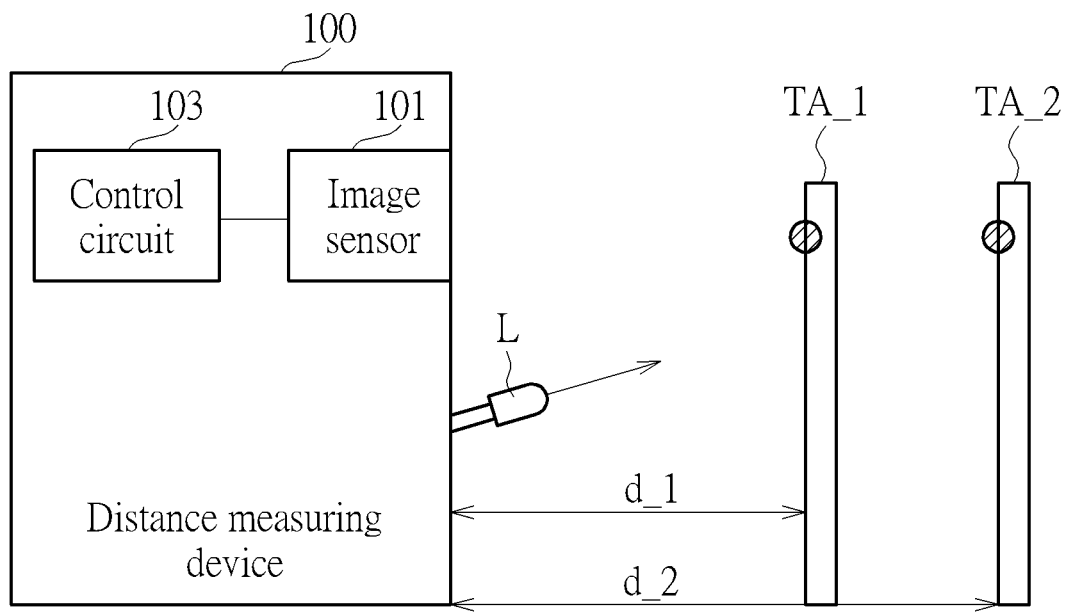
FIG. 6 is a schematic diagram illustrating relations between locations of the distance measuring device and locations of object images and flicker images, according to another embodiment of the present invention.
Figure 6:
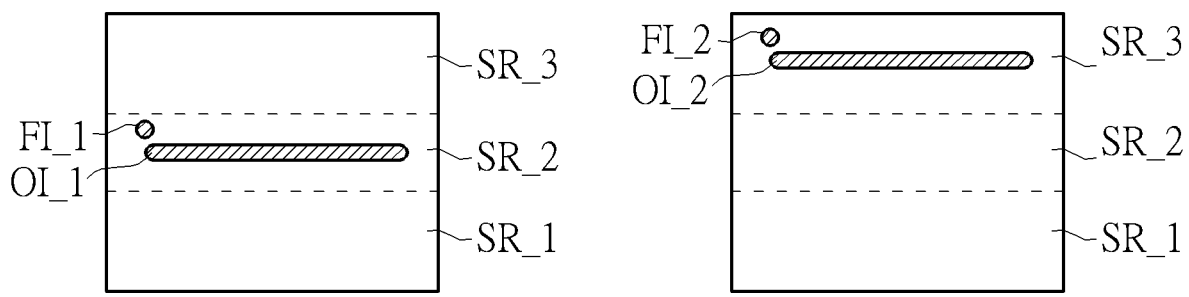

The locations of the image sensor 101 and the light source L are not limited to above-mentioned examples. FIG. 6 is a schematic diagram illustrating relations between locations of the distance measuring device and locations of object images and flicker images, according to another embodiment of the present invention. In the embodiment of FIG. 6, the light source L is below the image sensor 101 rather than above the image sensor 101. The light source L is a line light source and emits light at an angle inclined upward. Further, the object images OI_1, OI_2 indicate object images generated by light from the light source L, and flicker images FI_1, FI_2 indicate flicker images generated by ambient light.

Figure 7:
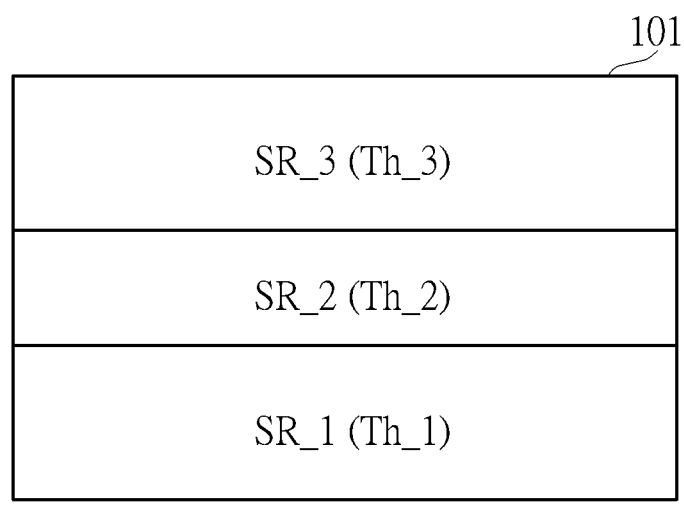
FIG. 7 is a schematic diagram illustrating a distribution for sensing thresholds of the image sensor according to another embodiment of the present invention.

FIG. 7 is a schematic diagram illustrating a distribution for sensing thresholds of the image sensor according to another embodiment of the present invention. The location and size of the second sensing regions SR_2 in FIG. 7 is the same as which of FIG. 2. However, the locations of the first sensing region SR_1 and the third sensing region SR_3 are swapped. The first sensing region SR_1, the second sensing regions SR_2 and the third sensing region SR_3 respectively have the first sensing threshold Th_1, the second sensing threshold Th_2 and the third sensing threshold Th_3, and Th_1>Th_2>Th_3.

Please refer back to FIG. 6, the distance measuring device 100 has a first distance d_1 from the target article TA_1 and a second distance d_2 from the target article TA_2. The second distance d_2 is larger than the first distance d_1. Light from the light source L respectively generate the object images OI_1, OI_2 on the target articles TA_1, TA_2. Besides, the ambient light generates the flicker images FI_1 and FI_2.

The object image OI_1 and the flicker image FI_1 are captured by the second sensing region SR_2. Also, since the second distance d_2 is larger than the first distance d_1, the object image OI_2 and the flicker image FI_2 move up thus captured by the third sensing region SR_3. Accordingly, the control circuit 103 can determine the distances between the image sensor 101 and the target article TA_1 or TA_2 according to locations of the object images OI_1, OI_2.

Further, the flicker images FI_1 and FI_2 can be filtered based on the second sensing thresholds TH_2 and the third sensing threshold Th_3. For more detail, if the brightness information of the flicker image FI_1 captured by the second sensing region SR_2 is smaller than the second sensing threshold Th_2, the control circuit 103 determines the flicker image FI_1 to be invalid. Thus the control circuit 103 does not use the flicker image FI_1 to compute the distance. Similarly, if the brightness information of the flicker image FI_2 captured by the third sensing region SR_3 is smaller than the third sensing threshold Th_3, the control circuit 103 determines the flicker image FI_2 to be invalid. Thus the control circuit 103 does not use the flicker image FI_2 to calculate the distance.

Additionally, in the embodiment of FIG. 6, the second distance d_2 is larger than the first distance d_1, thus brightness information of the flicker image FI_2 is lower than the brightness information of the flicker image FI_1. Therefore, the third sensing threshold Th_3 is lower than the second sensing threshold Th_2, and the second sensing threshold Th_2 is lower than the first sensing threshold Th_1.

It will be appreciated that the above-mentioned image sensor is not limited to be applied to a distance measuring device. The image sensor can be applied to any kind of image capturing device. Further, the arrangement of the light source L and the image sensor 101 is not limited to above-mentioned examples.

In view of above-mentioned embodiments, the distance measuring devices and the image sensor provided by the present invention can reduce the interference caused by the ambient light.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device, comprising:
    an image sensor, comprising:
        a first sensing region, having a first sensing threshold; and
        a second sensing region, having a second sensing threshold lower than the first sensing threshold, wherein the first sensing region and the second sensing region are configured to capture images;
    wherein at least one object image is determined to be invalid when the object image captured by the first sensing region has brightness formation lower the first sensing threshold;
    wherein at least one the object image is determined to be invalid when the object image captured by the second sensing region has brightness formation lower the second sensing threshold;
    wherein the object image is captured by the first sensing region when the image capturing device has a first distance from the target article, and the object image is captured by the second sensing region when the image capturing device has a second distance from the target article;
    wherein the first sensing threshold is inversely proportional to the first distance and the second sensing threshold is inversely proportional to the second distance.

2. The image capturing device of claim 1, further comprising:
    a light source, located above the image sensor, wherein the object image is generated by light from the light source or ambient light;
    wherein the second sensing region is located below the first sensing region.

3. The image capturing device of claim 2, wherein the light source is a point light source or a line light source.

4. The image capturing device of claim 1, further comprising:
    a light source, located below the image sensor, wherein the object image is generated by light from the light source or ambient light;
    wherein the second sensing region is located above the first sensing region.

5. The image capturing device of claim 4, wherein the light source is a point light source or a line light source.

6. The image capturing device of claim 1, wherein a size of the second sensing region is smaller than a size of the first sensing region.

7. A distance measuring device, comprising:
    a light source;
    an image sensor, configured to capture at least one object image generated by light from the light source or generated by ambient light, comprising:
        a first sensing region, having a first sensing threshold; and
        a second sensing region, having a second sensing threshold lower than the first sensing threshold, wherein the first sensing region and the second sensing region are configured to capture images; and
    a control circuit, configured to compute a distance between the image sensor and a target article according to the object image;
    wherein the control circuit does not use the object image to compute the distance when at least one object image captured by the first sensing region has brightness formation lower than the first sensing threshold;
    wherein the control circuit does not use the object image to compute the distance when at least one object image captured by the second sensing region has brightness formation lower than the second sensing threshold;
    wherein the object image is captured by the first sensing region when the distance measuring device has a first distance from the target article, and the object image is captured by the second sensing region when the distance measuring device has a second distance from the target article;
    wherein the first sensing threshold is inversely proportional to the first distance and the second sensing threshold is inversely proportional to the second distance.

8. The distance measuring device of claim 7, wherein the light source is located above the image sensor, and the second sensing region is located below the first sensing region.

9. The distance measuring device of claim 8, wherein the light source is a point light source or a line light source.

10. The distance measuring device of claim 7, further comprising:
wherein the light source is located below the image sensor, and the second sensing region is located above the first sensing region.

11. The distance measuring device of claim 10, wherein the light source is a point light source or a line light source.

12. The distance measuring device of claim 7, wherein a size of the second sensing region is smaller than a size of the first sensing region.

13. An image capturing device, comprising:
an image sensor, comprising:
a first sensing region, having a first sensing threshold; and
a second sensing region, having a second sensing threshold lower than the first sensing threshold, wherein the first sensing region and the second sensing region are configured to capture images;
wherein at least one object image is determined to be invalid when the object image captured by the first sensing region has brightness formation lower the first sensing threshold;
wherein at least one the object image is determined to be invalid when the object image captured by the second sensing region has brightness formation lower the second sensing threshold;
wherein the object image is captured by the first sensing region when the image capturing device has a first distance from the target article, and the object image is captured by the second sensing region when the image capturing device has a second distance from the target article;
wherein the first sensing threshold is inversely proportional to a square of the first distance and the second sensing threshold is inversely proportional to a square of the second distance.

14. An image capturing device, comprising:
an image sensor, comprising:
a first sensing region, having a first sensing threshold; and
a second sensing region, having a second sensing threshold lower than the first sensing threshold, wherein the first sensing region and the second sensing region are configured to capture images;
wherein at least one object image is determined to be invalid when the object image captured by the first sensing region has brightness formation lower the first sensing threshold;
wherein at least one the object image is determined to be invalid when the object image captured by the second sensing region has brightness formation lower the second sensing threshold;
wherein the object image is captured by the first sensing region when the image capturing device has a first distance from an object generating the object image, and the object image is captured by the second sensing region when the image capturing device has a second distance from the object;
wherein a difference between the first sensing threshold and the second sensing threshold is inversely proportional to a difference between the first distance and the second distance.

15. A distance measuring device, comprising:
a light source;
an image sensor, configured to capture at least one object image generated by light from the light source or generated by ambient light, comprising:
a first sensing region, having a first sensing threshold; and
a second sensing region, having a second sensing threshold lower than the first sensing threshold, wherein the first sensing region and the second sensing region are configured to capture images; and
a control circuit, configured to compute a distance between the image sensor and a target article according to the object image;
wherein the control circuit does not use the object image to compute the distance when at least one object image captured by the first sensing region has brightness formation lower than the first sensing threshold;
wherein the control circuit does not use the object image to compute the distance when at least one object image captured by the second sensing region has brightness formation lower than the second sensing threshold;
wherein the object image is captured by the first sensing region when the distance measuring device has a first distance from the target article, and the object image is captured by the second sensing region when the distance measuring device has a second distance from the target article;
wherein the first sensing threshold is inversely proportional to a square of the first distance and the second sensing threshold is inversely proportional to a square of the second distance.

16. A distance measuring device, comprising:
a light source;
an image sensor, configured to capture at least one object image generated by light from the light source or generated by ambient light, comprising:
a first sensing region, having a first sensing threshold; and
a second sensing region, having a second sensing threshold lower than the first sensing threshold, wherein the first sensing region and the second sensing region are configured to capture images; and
a control circuit, configured to compute a distance between the image sensor and a target article according to the object image;
wherein the control circuit does not use the object image to compute the distance when at least one object image captured by the first sensing region has brightness formation lower than the first sensing threshold;
wherein the control circuit does not use the object image to compute the distance when at least one object image captured by the second sensing region has brightness formation lower than the second sensing threshold;
wherein the object image is captured by the first sensing region when the image capturing device has a first distance from an object generating the object image, and the object image is captured by the second sensing region when the image capturing device has a second distance from the object;
wherein a difference between the first sensing threshold and the second sensing threshold is inversely proportional to a difference between the first distance and the second distance.

* * * * *